United States Patent

Sugimoto et al.

Patent Number: 5,224,595
Date of Patent: Jul. 6, 1993

[54] PACKAGE OF CEMENT MIXING MATERIAL

[75] Inventors: Kenji Sugimoto; Koichi Nagase, both of Tokyo; Yoshimitsu Sekiguchi, Chiba; Toshihiro Okada, Narashino; Takehiko Kurusu, Kamakura, all of Japan

[73] Assignees: Taisei Corp., Tokyo, Japan; Lion Corp., Tokyo, Japan

[21] Appl. No.: 788,680

[22] Filed: Nov. 6, 1991

[30] Foreign Application Priority Data

Nov. 7, 1990 [JP] Japan .................. 2-303388
Jun. 6, 1991 [JP] Japan .................. 3-163708

[51] Int. Cl.$^5$ ............................. B65D 85/46
[52] U.S. Cl. ................ 206/321; 206/524.7; 106/823
[58] Field of Search ........... 206/321, 322, 219, 524.7; 106/823; 162/164.3

[56] References Cited

U.S. PATENT DOCUMENTS

| | | | |
|---|---|---|---|
| 3,086,007 | 4/1963 | Touey et al. | 260/215 |
| 3,113,674 | 12/1963 | Keifer et al. | 206/84 |
| 3,892,905 | 7/1975 | Albert | 428/220 |
| 4,218,286 | 8/1980 | Jones et al. | 162/164 R |
| 4,961,790 | 10/1990 | Smith et al. | 106/823 |

*Primary Examiner*—Mark L. Bell
*Assistant Examiner*—A. Wright
*Attorney, Agent, or Firm*—Armstrong, Westerman, Hattori, McLeland & Naughton

[57] ABSTRACT

Using a packaging material containing a fibrous substance such as pulp and a carboxyl-containing polymer a substance such as an acid type carboxymethyl cellulose, a cement mixing material such as a superplasticizer is packaged and the package is thrown into a cement formulation such as concrete, mortar or a cement paste in a truck agitator.

9 Claims, No Drawings

PACKAGE OF CEMENT MIXING MATERIAL

BACKGROUND OF THE INVENTION

1. Field of the Invention

The present invention relates to a method of adding a mixing material and/or a mixing agent to provide a cement admixture such as concrete, mortar, cement paste, and a package of a mixing material to be used therefor.

2. Description of the Related Art

Currently, as a mixing material, there are employed a superplasticizer, an air-entraining agent, an air-entraining water-reducing agent, a super air-entraining water-reducing agent, a setting accelerating agent, a setting retarder, a separation reducing agent, a rust or corrosion inhibitor, an expanding agent, a polymer mixing agent, a shrinkage reducing agent, a coloring agent, or a reinforcing material. These materials are added to predetermined amounts of cement mixing materials corresponding to the standard recipe of cement formulations such as concrete, mortar, or cement paste. Particularly, with regard to a superplasticizer, after a visual measurement of the slump of the concrete transported by a truck agitator by an expert sent from a manufacturer, the amount of superplasticizer to be thrown must be determined before metering and throwing from a drum can or an atron can, or it must be thrown by an automatic metering pump, and this is cumbersome.

When using a mixing material, the mixing material may leak or drip during the metering and throwing, and thus will contaminate the working site and cause a deterioration of the working environment. Further, the used packaging materials such as drum cans require much time for cleaning, as well as time required for the maintenance and storage of remaining mixing materials, metering instruments and metering pumps.

Accordingly, the present inventors proposed an addition of a superplasticizer agent to a cement admixture by throwing a package including a suplasticizer into a truck agitator (Japanese Patent Application No. 2-46973).

SUMMARY OF THE INVENTION

The objects of the present invention are to eliminate the above-mentioned disadvantages of the prior art and to provide an addition method by which a cement mixing material can be added to a cement admixture simply and without the need for metering, thus making it unnecessary to treat the mixing material vessel, and which prevents a cracking of the surface after the hardening of a cement formulation such as concrete, mortar, or cement paste.

Other objects and advantages of the present invention will be apparent from the following description.

In accordance with the present invention, there is provided a package comprising a mixing material for a cement admixture filled in an alkali hydrolyzable packaging material composed of a fibrous substance and a carboxyl-containing polymer, to be disintegrated in a cement admixture.

In accordance with the present invention, there is also provided a method of adding a cement mixing material, which comprises throwing and stirring a package comprising a cement mixing material filled in a packaging material comprising a fibrous substance and a carboxyl-containing polymer to disintegrate the packaging material and thereby release the mixing material for a cement admixture, and uniformly mixing the cement mixing material for a cement admixture and the fibrous substance into the cement admixture.

DESCRIPTION OF THE PREFERRED EMBODIMENTS

The terms "a cement mixing material" used herein means a mixing material and/or a mixing agent for a cement admixture such as a superplasticizer, an air-entraining agent, a water-reducing agent, a super water-reducing agent, a foaming agent, a gas foaming agent, a setting accelerator, a setting retarder, a rust or corrosion inhibitor, a permeability reducer, a shrinkage reducing agent, a coloring agent, and a reinforcing material.

The present invention will now be described in detail.

As the packaging material to be used in the package of the present invention, a material containing a fibrous substance may be employed, for example, paper. Also, preferably an alkali hydrolyzable packaging material is employed, most preferably an alkali hydrolyzable packaging material which is non-hydrolyzable or almost non-hydrolyzable in a neutral to acidic water, but is alkali hydrolyzable. The alkali hydrolyzable packaging material has a weak bonding of the fibrous substance in an alkaline cement admixture, and thus the disintegration of the packaging material and the dispersion of the fibrous substance in the cement admixture become easier.

The fibrous substance is not particularly limited, provided that it is a fibrous material having a dispersibility in water. For example, there may be included wood pulps, non-wood pulps, rayon fibers, polyester fibers, and hemp fibers. More specifically, preferably a kraft pulp or sulfite pulp for paper making or a dissolved pulp for chemical fibers is employed. Note, vegetable fibers such as straw pulp, hemp pulp, cotton pulp, synthetic fibers such as polyamide, and polyether also can be used, and further, inorganic fibers such as glass fiber, asbestos, rock wool, slug fiber, silica, and silica-alumina fiber can be employed.

Also, the packaging material of the present invention should contain, in addition to a fibrous substance, a carboxyl-containing polymer.

Preferably, the carboxyl-containing polymer can be dissolved or swollen in a cement admixture, and most preferably is not substantially dissolved or swollen in a neutral or acidic water but is dissolved or swollen in an alkaline cement mixture. The packaging material using such a polymer and a fibrous substance in combination can be mixed in a cement admixture, whereby the polymer is quickly solubilized and the bonding of the fibrous substance weakened to effect a disintegration thereof and a release of the cement mixing material, simultaneously with a loosening of the fibrous substance to be uniformly dispersed in the cement admixture, but before being thrown into cement admixture, it must have a sufficient strength as a packaging material.

Specific examples of the carboxyl-containing polymer include polysaccharide derivatives, synthetic polymers, and natural products.

The polysaccharide derivative include carboxymethyl cellulose, carboxyethyl cellulose, and carboxymethylated starch, or salts thereof. Carboxymethyl cellulose (CMC) is particularly preferable, and the acid type CMC-H or CMC-Ca, CMC-Al is included. The degree of substitution (DS) of the CMC is not particularly limited, but is preferably from 0.2 to 1.0.

As the synthetic polymer, polymers of unsaturated carboxylic acids or copolymers of two or more unsaturated carboxylic acids, or copolymers with other monomers copolymerizable with unsaturated carboxylic acids, or salts thereof, are included. As such unsaturated carboxylic acids, there are included acrylic acid, methacrylic acid, itaconic acid, crotonic acid, maleic anhydride, maleic acid, and fumaric acid and the like. As monomers copolymerizable with unsaturated carboxylic acids, there are included esters of the unsaturated carboxylic acids, vinyl acetate, and olefins such as ethylene, and acrylamide and vinyl ether.

As the natural products, alginic acid, xanthan gum, gum tragacanth, and pectin can be employed.

The formulation ratio of the carboxyl-containing polymer to the fibrous substance is preferably from 80/20 to 0.1/99.9, more preferably from 70/30 to 1/99, most preferably from 65/35 to 3/97, all by weight.

The method of preparing the packaging material of the present invention is not particularly limited, and methods of preparing conventional papers can be used as such. Nevertheless, when the packaging material using the fibrous substance and the carboxyl-containing polymer in combination is prepared by a wet or dry process known in the art, both may be integrated. For example, the packaging material can be prepared by a mixed paper-making of the fibrous substance and the carboxyl-containing polymer, or by coating the carboxyl-containing polymer on the formed paper, or by spraying and drying the carboxyl-containing polymer onto a web of fibers. In the case of a mixed paper making, a carboxyl-containing polymer as described above, which is insoluble or substantially insoluble in water, may be employed.

The basis weight of the sheet-shaped packaging material is preferably 20 to 200 g/m$^2$, most preferably 25 to 180 g/m$^2$.

The preparation of a vessel for a package in the shape of a bag can be made by adhering the above packaging materials (sheets) by using an adhesive or by sewing them together. Further, since it is considered industrially advantageous to prepare bags by a method such as heat sealing, in this case it is preferable to apply a treatment such as a coating, impregnation, lamination or multi-layer formation of laminates, to the above packaging sheet, with a heat-sealable polymer. The heat-sealable polymer includes, for example, polyvinyl acetate or partially saponified products thereof, polyvinyl alcohol, polyvinyl pyrrolidone, polyacrylic acid, acrylic acid-acrylate copolymer, ethylene-vinyl acetate copolymer, and vinyl pyrrolidone-vinyl acetate copolymer.

As the cement mixing material included in the packaging material of the present invention, all known mixing materials can be used, and the kinds thereof are not limited. The mixing material is preferably in such a form that can be readily dispersed in the cement admixture, and if necessary, powdered. Also, the packaging material of the present invention can be used as the packaging material of the cement itself, or as the packaging material of a mortar formulation or a concrete formulation, and further, as the packaging material of a cement, a mortar formulation or a concrete formulation in which a cement mixing material is formulated.

For example, as the superplaticizer agent there can be employed polystyrene sulfonic acid (salts), naphthalene sulfonic acid formalin condensate (salts), ligninsulfonic acid (salts), polycarboxylic acid (salts), melamine sulfonic acid (salts), polyphenolsulfonic acid (salts), oxycarboxylic acid (salts), and organic acid (salts) of styrene-maleic anhydride copolymers, and inorganic acid salts such as phosphate, pyrophosphate, tripolyphosphate, hexametaphosphate, and siliconfluoride, either alone or in combination.

As the air-entraining agent, anionic surfactants such as the soap type, sulfate type, sulfonate type, and phosphate type; nonionic surfactants such as the ether type and ester ether type; and amphoteric surfactants such as the betaine type and imidazoline betaine type can be employed either alone or in combination.

As the water-reducing agent, there can be employed ligninsulfonic acid salts and derivatives thereof, oxycarboxylic acid salts, polyol derivatives, polyoxyethylene alkylaryl ether derivatives, formalin condensates of alkylarylsulfonic acid, formalin condensate of melaminesulfonic acid salts, and polycarboxylic acid type polymers, either alone or in combination.

As the super (air-entraining) water reducing agent, known agents such as the anion type special polymeric active agents lignin sulfonic acid derivatives, polyether carboxylic acid type polymeric compounds, polycarboxylic acid ether type complexes, special sulfonic-, carboxylic-containing multi-component polymers, and any type of the super (air-entraining) water-reducing agent, can be used.

As the foaming agent, synthetic surfactant types, such as anionic surfactants, i.e., carboxylic acid salts, sulfate salts, sulfonic acid salts, and phosphate salts; cationic surfactants such as primary, secondary, tertiary amine salts, and quaternary ammonium salts; amphoteric surfactants such as the amino acid type and betaine type; and nonionic surfactants such as the polyethylene glycol type and polyhydric alcohol type can be employed. Also, resin soaps, protein type foaming agents, saponin, and polymeric resin type surfactants can be employed. These foaming agents can be used either alone or in combination.

As the gas foaming agent, hydrazine type compounds, diazonium type compounds, and metal aluminum can be employed.

As the setting accelerator and retarder, chlorides, carbonates, sulfates and nitrates of calcium, sodium, and calcium fluoride can be employed as the setting accelerator. As the retarder, organic types of oxycarboxylic acids such as gluconic acid, glucoheptoic acid, salts of keto acids, sugars and sugar alcohols, and inorganic types of siliconfluorides, phosphates, and borates can be employed. As the quick setting agent, calcium chloride, aluminum hydroxide, sodium carbonate, sodium hydroxide, sodium aluminate, and calcined alum can be employed.

As the rust or corrosion inhibitor, inorganic salts such as sulfites, chromates, silicates, and phosphates, and organic types such as organic phosphate salts, organic acid salts, sulfonic acid salts, amines, and alkylphenols can be employed.

As the permeability reducer, inorganic types such as the sodium silicate type and calcium chloride type, and organic type waterproof agents such as the aliphatic acid type can be employed.

As the shrinkage reducing agent, lower alcohol alkylene oxide adducts, the polyether type, and the polyglycol type, and inorganic types such as aluminum type natural ores, can be employed.

As the coloring agent, titanium oxide (white), red iron oxide (red), synthetic iron oxide $Fe_2O_3 \cdot H_2O$ (yellow), chromium oxide (green), ultramarine 2 $(Al_2Na_2\cdot Si_3O_{10}) \cdot Na_2SO_4$, cobalt blue $(CoO \cdot Al_2O_3)$ (blue), $Co_3(PO_4)_2$, $Fe_2O_3$ (violet), and carbon, $Fe_2O_3 \cdot FeO$ (black) can be used.

As the reinforcing material to be used for reinforcing the flexural and tensile strength, synthetic fibers such as vinylon, nylon, polyethylene terephthalate fiber, aromatic polyamide fiber, and polypropylene, ceramic fibers such as carbon, rock wool, whisker, and white sand, glass fibers such as alkali resistant glass, wood fibers such as wood, and hemp, and metal fibers such as stainless steel may be included. These fibers may be employed in the dispersed form, in a roll shape which can be dispersed in fibers by mixing, and in a panel form.

Although the above-mentioned cement mixing material such as a superplasticizer can be filled and packaged alone in the package, a plurality of materials also can be formulated, filled and packaged for use, provided that they can be used as an admixture.

When the cement mixing material package of the present invention is thrown into a cement admixture such fresh concrete or fresh mortar in, for example, a truck agitator, and then stirred, the packaging material is disintegrated by the mechanical force, or the swelling or dissolving of the carboxyl-containing polymer, whereby the cement mixing material filled in the package is released. When stirring is further continued, the fibrous substance and the released mixed material, which have constituted the packaging material, are uniformly dispersed in the cement admixture and the mixing material will exhibit a superior effect. Further, the fibrous material will reduce the number of cracks propagated on the surface of the cement composition after setting.

According to the present invention, the following effects can be obtained.

(1) The cement mixing material can be packaged in predetermined amount corresponding to the standard formulation of the cement composition such as a concrete or mortar, and the need for metering during usage can be eliminated. Also, there is no dropping or scattering of the mixing material, and thus a metering instrument or throwing tool is not required and the management is facilitated.

(2) Since the package vessel is dispersed in the cement, no treatment of the vessel is required.

(3) The fibrous substance constituting the packaging material is uniformly dispersed in cement, and thus reduces cracking of the cement surface after setting.

EXAMPLES

The present invention is described in more detail with reference to Examples, which in no way limit the present invention.

(1) Preparation of Packaging Material

Preparation Examples 1–10

The dispersion obtained by formulating the carboxyl-containing polymer and the fibrous substance shown in Table 1 in predetermined amounts was diluted to form a 1% slurry, thoroughly stirred, and then a hand-made sheet was prepared by a rectangular sheet machine (produced by Kumagai Riki Kogyo). The obtained sheet was dried by a roll rotary dryer at 105° C. to prepare an alkali hydrolyzable sheet in which the fibrous substance and the fibrous carboxymethyl cellulose were subjected to a mixed paper making process.

Preparation Example 11

A polyacrylic acid was sprayed onto a sheet prepared from the fibrous substance shown in Table 1, to 10% by weight based on the dry sheet, and dried to prepare an alkali hydrolyzable sheet.

Preparation Example 12

A paper making process was performed in the same manner as in Preparation Example 1 by using the fibrous substance shown in Table 1 to prepare a pulp sheet. The sheet was coated by a gravure coater with the carboxyl-containing polymer shown in Table 1, to 5% by weight based on the dry sheet, and dried to obtain an alkali hydrolyzable sheet.

Preparation Example 13

Example 2 was coated a polyvinyl acetate resin emulsion to 20% by weight based on the dry sheet and dried to prepare an alkali hydrolyzable sheet.

Example 1

The sheets obtained in Preparation Examples 1 to 12 were evaluated by the following methods, to obtain the results shown in Table 1.

The tensile strength was measured according to JIS P 8113, whereby the packaging material was left to stand for one day and night under the conditions of a temperature of 20° C. and a humidity of 65%, and then the tensile strength was measured by an RTM-25 produced by Orientic.

The ability of the packaging material to disintegrate in fresh concrete and fresh mortar was evaluated by determining whether or not the packaging material was completely disintegrated within one minute and the fibrous substance dispersed, when a paper strip 50 mm × 50 mm was immersed in 500 ml of saturated calcium hydroxide and the mixture stirred with a stirrer.

Evaluation standards

++: excellent dispersibility
+: good dispersibility
±: fair dispersibility

The usability of the cement mixing material as the packaging material was judged to be acceptable if the tensile strength was 1.5 kg or higher in both the longitudinal and transverse directions, and the ability to disintegrate was "+" or better.

TABLE 1

| Preparation example | Carboxyl-containing polymer ($\alpha$) | Fibrous substance ($\beta$) | $\alpha/\beta$ (weight ratio) | Basis weight (g/m²) | Tensile strength (kg) Longitudinal direction | Tensile strength (kg) transverse direction | Disintegratability | Judgment |
|---|---|---|---|---|---|---|---|---|
| 1 | CMC-Ca/Na (DS = 0.4) | NBKP | 65/35 | 50 | 6.8 | 3.8 | + | + |
| 2 | CMC-H (DS = 0.65) | NBKP | 40/60 | 50 | 5.5 | 2.5 | + | + |

TABLE 1-continued

| Preparation example | Carboxyl-containing polymer (α) | Fibrous substance (β) | α/β (weight ratio) | Basis weight (g/m²) | Tensile strength (kg) Longitudinal direction | transverse direction | Disintegratability | Judgment |
|---|---|---|---|---|---|---|---|---|
| 3 | CMC-H (DS = 0.4) | NBKP | 25/75 | 50 | 4.8 | 2.6 | ++ | + |
| 4 | CMC-Ca (DS = 0.65) | NBKP | 40/60 | 25 | 2.5 | 1.5 | + | + |
| 5 | CMC-H (DS = 0.4) | Rayon | 40/60 | 55 | 6.0 | 3.1 | + | + |
| 6 | CMC-Al (DS = 0.2) | NBKP | 40/60 | 180 | 9.5 | 5.5 | + | + |
| 7 | CMC-H (DS = 0.4) | NBKP | 5/95 | 50 | 3.5 | 1.9 | ++ | + |
| 8 | CMC-H (DS = 0.4) | NBKP | 3/97 | 40 | 2.9 | 1.6 | ++ | + |
| 9 | CMC-H (DS = 0.65) | NBKP | 10/90 | 50 | 3.8 | 2.1 | ++ | + |
| 10 | CMC-H (DS = 0.4) | NBKP | 15/85 | 40 | 2.8 | 1.9 | ++ | + |
| 11 | Polyacrylic acid | NBKP | 10/90 | 55 | 4.5 | 2.2 | ± | + |
| 12 | AA/EA copolymer (10/90) | NBKP | 5/95 | 55 | 4.2 | 2.2 | ± | + |
| 13 | CMC-H (DS = 0.4) | NBKP | 40/60 | 50 | 6.0 | 3.2 | + | + |

*)
CMC: Carboxymethyl cellulose
AA/EA copolymer: Acrylic acid/ethyl acrylate copolymer
NBKP: Conifer bleached kraft pulp The following is an example in which the mixing material was placed in the packaging material of the present invention to prepare a package, and the performance thereof confirmed.

Example 2

A powdery superplasticizer and a retarder were filled in a package made of the packaging material of the present invention, and the fluidization of the concrete was determined.

TABLE 2

| Formulation of base concrete | | |
|---|---|---|
| Water | Tap water | 175 kg/m³ |
| Cement | Produced by Onoda Cement K.K. Specific gravity 3.16 | 320 kg/m³ |
| Fine aggregate | River sand from: River Fuji FM 2.30. Specific gravity 2.65 | 833 kg/m³ |
| Coarse aggregate | Crushed stone from Kisarazu FM 6.80. Specific gravity 2.60 Max. size of coarse aggregate 20 mm | 1001 kg/m³ |
| s/a | 46% | |
| AE water reducer | Pozolith No. 70 | 0.83 kg/m³ |
| AE agent | Pozolith No. 303A | 0.03 kg/m³ |

A base concrete with a slump of 12 cm, an amount of air of 4.0%, according to the formulation shown in Table 2, was prepared in a concrete factory, transferred to a 6 m³ truck agitator, and then transported to the construction site.

Sodium polystyrene sulfonate as the superplasticizer, and sodium gluconate as the retarder, were each metered in predetermined amount and filled in bags prepared by using the packaging materials of Preparation Example 2 and Preparation Example 7, respectively, in predetermined amounts. Then the package obtained (package of the invention) was thrown into the truck agitator at the construction site, and agitated for 2 minutes to effect a fluidization before construction.

As a test of the performance of the fluidized concrete, the slump was evaluated according to JIS A 1101.

The cracking of the concrete surface was evaluated by using a fluidized concrete which was fluidized according to the prior art method (the mixing agent was added directly without packaging) and a fluidized concrete which was fluidized by an addition of the superplasticizer filled in a package made of the packaging material of the present invention and placing a restricting body (made of iron) 50 cmφ × 10 cm at the central portion and penetrating in the thickness direction, to prepare a test sample having an area of 1 m² × thickness 10 cm, and measuring the amount cracks (m/m²) of 0.04 m or more after 6 months under the conditions of a temperature of 30° C. and a humidity of 60%.

As a result of this evaluation, the package of the present invention using the packaging materials of Preparation Example 2 and Preparation Example 7 fluidized a slump 11.5 cm and 11.8 cm of the base concrete in the fresh concrete truck to 21.2 cm, 21.5 cm, respectively, relative to the target slump of 21 cm.

Regarding the cracking of the surface, in contrast to the amount of cracks of 2.6 (m/m²) in the concrete fluidized according to the prior art method, the amount of cracks in the concrete to which the superplasticizer and the retarder packaged in the packaging material of the present invention were added was as small as 1.56 (m/m²) (Preparation Example 2) and 1.50 (m/m²) (Preparation Example 7).

Example 3

The results of an evaluation of the performance when a powdery super air-entraining water-reducing agent was placed in the package of the present invention are shown.

The package was prepared by filling and sealing a predetermined amount of a super air-entraining water-reducing agent, with a water reduction ratio of 18%, of a powdered anion type special polymer active agent in bags prepared by using the packaging materials of Preparation Example 5 and Preparation Example 7, respectively.

TABLE 3

| Formulation of base concrete | | |
|---|---|---|
| Water | Tap water | 162 kg/m³ |
| Cement | Produced by Onoda Cement K.K. Specific gravity 3.16 | 320 kg/m³ |
| Fine aggregate | River sand from: River Fuji FM 2.30, Specific gravity 2.65 | 829 kg/m³ |
| Coarse aggregate | Crushed stone from Kisarazu FM 6.80, Specific gravity 2.60 Max. size of coarse aggregate 20 mm | 995 kg/m³ |
| s/a | 45% | |

Into the base concrete having the composition shown in Table 3 (target slump 12 cm, air amount 4%) was added the package of the present invention, followed by stirring by a mixer for 2 minutes, and as a result, in both cases concretes with a slump of 21.5 cm were prepared.

Regarding the cracking of the surface, in contrast to the amount of cracks 2.0 (m/m$^2$) in the concrete fluidized according to the prior art method, the amount of cracks in the concretes to which the high performance AE water reducers packaged with the packaging materials of Preparation Example 5 and Preparation Example 7 of the present invention were added were, respectively, as small as 1.80 (m/m$^2$) (Preparation Example 5) and 1.75 (mm$^2$) (Preparation Example 7).

An example is shown in which a foaming agent was placed in the packaging material of the present invention and the performance thereof evaluated.

TABLE 4

| Formulation of base mortar | | |
| --- | --- | --- |
| Water | Tap water | 176 kg/m$^3$ |
| Cement | Produced by Onoda Cement K.K. Specific gravity 3.16 | 450 kg/m$^3$ |
| Fine aggregate | River sand from River Fuji FM 2.30, Specific gravity 2.65 | 1560 kg/m$^3$ |
| Base flow | | 190 mm |

A foaming agent of powdered commercially available Palmix (sodium salt of olefinsulfonate) and the super air-entraining water-reducing agent of Example 3 were filled in the package made from the packaging material of Preparation Example 2, in a predetermined amount (0.02% in C×% by weight), to prepare the package of the present invention.

The above package was added to the mortar in Table 4, followed by kneading by a mixer for 3 minutes, and as a result, a foam mortar with a specific gravity of 1.4 and a flow of 220 mm was prepared.

Regarding the cracking of the surface, in contrast with the amount of cracks 3.1 (m/m$^2$) in the mortar to which the foaming agent according to the prior art method was added, the amount of cracks in the mortar to which the package with the packaging material of the present invention was added was as small as 2.8 (m/m$^2$).

Example 5

An example is shown in which a blowing agent was placed in the packaging material of the present invention, and the performance thereof evaluated.

TABLE 5

| Formulation of base concrete | | |
| --- | --- | --- |
| Water | Tap water | 155 kg/m$^3$ |
| Cement | Produced by Onoda Cement K.K. Specific gravity 3.16 | 408 kg/m$^3$ |
| Fine aggregate | River sand from River Fuji FM 2.30, Specific gravity 2.65 | 713 kg/m$^3$ |
| Coarse aggregate | Mesalite, Specific gravity 1.3 Max. size of coarse aggregate 15 mm | 489 kg/m$^3$ |
| s/a | 43% | |
| Base slump | 12.5 cm | |

A gas foaming agent of powdered commercially available Palmix (sodium salt of olefinsulfonate) and a predetermined amount of the super air-entraining water-reducing agent were filled in the package made from the packaging material of Preparation Example 2, in a predetermined amount (0.02% in C×weight), to prepare the package of the present invention.

The package was thrown into the base concrete shown in Table 5, and the mixture kneaded by a mixer for 3 minutes, and as a result, a concrete with a specific gravity of 1.2 and a slump of 21 cm was prepared.

Regarding the cracking of the surface, in contrast with the amount of cracks 3.5 (m/m$^2$) in the concrete to which the gas foaming agent according to the prior art method was added, the amount of cracks in the concrete to which the package with the packaging material of the present invention was added was as small as 3.0 (m/m$^2$).

Example 6

An example is shown in which a setting agent and a retarder were placed in the packaging material of the present invention and the performance thereof evaluated.

TABLE 6

| Formulation of base concrete | | |
| --- | --- | --- |
| Water | Tap water | 180 kg/m$^3$ |
| Cement | Produced by Onoda Cement K.K. Specific gravity 3.16 | 300 kg/m$^3$ |
| Fine aggregate | River sand from: River Fuji FM 2.30, Specific gravity 2.65 | 819 kg/m$^3$ |
| Coarse aggregate | Crushed stone from Kisarazu FM 6.80, Specific gravity 2.60 Max. size of coarse aggregate 20 mm | 981 kg/m$^3$ |
| s/a | 46% | |
| AE* water-reducing agent | Pozolith No. 70 | 0.38 kg/m$^3$ |
| AE* agent | Pozolith No. 303A | 0.03 kg/m$^3$ |
| Base slump | 18 cm (Preparation Example 2) 15.5 cm (Preparation Example 7) | |
| Air content | 4.2% (Preparation Example 2 3.7% (Preparation Example 7) | |

*Air-entraining

A commercially available calcined alum as the setting accelerator, or a commercially available citric acid powder as the retarder was filled in the package made respectively from the packaging materials of Preparation Example 2 and Preparation Example 7, in predetermined amounts respectively (calcined alum: 1% in C×weight, citric acid: 0.1% in C×weight), to prepare packages.

The package filled with the setting accelerator was thrown into a base concrete, followed by stirring, to make a concrete. The same setting accelerator was also added directly into the base concrete, followed by stirring to make a concrete.

The results of a measurement of the properties of these fresh concretes, the setting time of the setting accelerator, and the strength thereof are summarized in Table 7.

TABLE 7

| | Result of evaluation of hardening time | | |
| --- | --- | --- | --- |
| | No accelerator | Accelerator mixed | Packaged accelerator mixed |
| Slump | 18.0 cm | 16.5 cm | 16.0 cm |
| Amount of air | 4.2% | 4.0% | 3.8% |
| Setting: | | | |
| initial | 5 hours 50 min. | 3 hours 10 min. | 3 hours 15 min. |
| final | 7 hours 40 min. | 5 hours 35 min. | 5 hours 45 min. |
| Compressive strength (material age, 28 days) | 280 kgt/cm$^2$ | 275 kgt/cm$^2$ | 276 kgt/cm$^2$ (Preparation Example 2) 275 kgt/cm$^2$ (Preparation Example 7) |

Regarding the cracking of the surface, in contrast with the amount of cracks 2.10 (m/m$^2$) in the concrete to which the setting accelerator according to the prior art method was added, the amount of cracks in the concrete to which the package with the packaging material of the present invention was added was as small as 1.95 (m/m$^2$) (Preparation Example 2) and 1.90 (m/m$^2$) (Preparation Example 7).

Similarly, by using the package filled with the packaging material of Preparation Example 2, the results of the measurement of the setting agent and the strength of the concrete by using the retarder are summarized in the following Table 8.

TABLE 8

| Result of evaluation of hardening time | | |
|---|---|---|
| | Retarder | Packaged retarder |
| Setting: | | |
| initial | 7 hours 20 min. | 7 hours 25 min. |
| final | 10 hours 10 min. | 10 hours 17 min. |
| Compressive strength (material age. 28 days) | 285 kgt/cm$^2$ | 282 kgt/cm$^2$ |

Regarding the cracking of the surface, in contrast with the amount of cracks 1.95 (m/m$^2$) in the concrete to which the retarder according to the prior art method was added, the amount of cracks in the concrete to which the package with the packaging material of the present invention was added as small as 1.82 (m/m$^2$).

Example 7

An example is shown in which an antirust agent was placed in the packaging material of the present invention and the performance thereof evaluated.

TABLE 9

| Formulation of base concrete | | |
|---|---|---|
| Water | Tap water | 181 kg/m$^3$ |
| Cement | Produced by Onoda Cement K.K. Specific gravity 3.16 | 302 kg/m$^3$ |
| Fine aggregate | River sand from River Fuji FM 2.30, Specific gravity 2.65 | 835 kg/m$^3$ |
| Coarse aggregate | Crushed stone from Kisarazu FM 6.80, Specific gravity 2.60 Max. size of coarse aggregate 20 mm | 975 kg/m$^3$ |
| s/a | 47% | |

As the rust inhibitor, a commercially available calcium sulfite powder was filled in the package made from the packaging material of Preparation Example 2, in a predetermined amount (5% in C×weight) to make the package of the present invention.

To the base concrete shown in Table 9 was added the above package, followed by kneading for 2 minutes to make a concrete having ak high rust inhibiting effect, to be used as a marine concrete.

The same rust inhibitor also was added directly to the base concrete to make a concrete.

These fresh concretes were found to have the properties as shown in Table 10.

TABLE 10

| | Slump | Air content |
|---|---|---|
| Base concrete | 19.5 cm | 4.2% |
| Rust inhibitor added | 18.5 cm | 4.0% |
| Packaged rust inhibitor added | 18.0 cm | 4.3% |

The rust inhibiting power was evaluated according to the method in which a concrete with a salt content of 1.0% was made at the ratios as mentioned above, and the corrosion weight reduction ratio of the internal steel skeleton at the material age of 30 days was measured.

The rust inhibiting effect was 80 mg/cm$^2$, without the antirust agent, 58 mg/cm$^2$ when 5% of the rust inhibitor was added, and 60 mg/cm$^2$ when the rust inhibitor filled in the package was added.

Regarding the cracking of the surface, in contrast with the amount of cracks 2.2 (m/m$^2$) in the concrete to which the rust inhibitor according to the prior art method was added, the amount of cracks in the concrete to which the package with the packaging material of the present invention was added was as small as 2.0 (m/m$^2$).

Example 8

An example is shown in which a shrinkage reducing agent was filled in the packaging material of the present invention and the performance thereof evaluated.

TABLE 11

| Formulation of base concrete | | |
|---|---|---|
| Water | Tap water | 171 kg/m$^3$ |
| Cement | Produced by Onoda Cement K.K. Specific gravity 3.16 | 300 kg/m$^3$ |
| Fine aggregate | River sand from River Fuji FM 2.30, Specific gravity 2.65 | 855 kg/m$^3$ |
| Coarse aggregate | Crushed stone from Kisarazu FM 6.80, Specific gravity 2.60 Max. size of coarse aggregate 20 mm | 971 kg/m$^3$ |
| s/a | 47% | |
| AE agent | Pozolis No. 303A | 0.03 kg/m$^3$ |

As the shrinkage reducing agent, a commercially available powdery Pulace (composed mainly of aluminum type natural ore) was filled in the packages made from the packaging material of Preparation Example 2 and Preparation 7, respectively, in predetermined amounts (3% in C×weight) to prepare packages.

The packages were thrown into the base concrete, followed by stirring to make concretes.

The same shrinkage reducer also was added directly into the base concrete, followed by stirring to make a concrete.

These fresh concretes were found to have the properties as shown below in Table 12.

TABLE 12

| | Slump | Air content |
|---|---|---|
| Base concrete | 18.0 cm | 4.4% |
| Shrinkage reducing agent added | 17.0 cm | 3.8% |
| Packaged reducing agent added | 16.8 cm | 4.0% (Preparation Example 2) |
| | 16.8 cm | 4.0% (Preparation Example 7) |

The performance of the concrete at the material age of 182 days was as shown below in Table 13.

TABLE 13

| | Creep coefficient | Amount of shrinkage |
|---|---|---|
| Base concrete | 1.88 | 7.3 × 10$^{-4}$ |
| Shrinkage reducing agent added | 1.50 | 6.5 × 10$^{-4}$ |
| Packaged shrinkage reducing agent added | 1.48 | 6.0 × 10$^{-4}$ (Preparation Example 2) |
| | 1.47 | 5.8 × 10$^{-4}$ (Preparation |

TABLE 13-continued

| | Creep coefficient | Amount of shrinkage |
|---|---|---|
| | | Example 7) |

Regarding the cracking of the surface, in contrast with the amount of cracks 1.55 (m/m²) in the concrete to which the shrinkage reducing agent according to the prior art method was added, the amount of cracks in the concrete to which the package with the packaging material of the present invention was added was as small as 1.30 (m/m²) (Preparation Example 2) and 1.25 (m/m²) (Preparation Example 7).

Example 9

An example is shown in which a coloring agent was placed in the packaging material of the present invention and the performance thereof evaluated.

TABLE 14

| Formulation of base concrete | | |
|---|---|---|
| Water | Tap water | 175 kg/m³ |
| Cement | Produced by Onoda Cement K.K. Specific gravity 3.16 | 400 kg/m³ |
| Fine aggregate | River sand from River Fuji FM 2.30, Specific gravity 2.65 | 658 kg/m³ |
| Coarse aggregate | Crushed stone from Kisarazu FM 6.80, Specific gravity 2.60 Max. size of coarse aggregate 20 mm | 946 kg/m³ |
| s/a | 41% | |
| AE water reducer | Pozolith No. 70 | 0.38 kg/m³ |
| AE agent | Pozolith No. 303A | 0.03 kg/m³ |

As the result of a preparation according to the make-up shown in Table 14, a base concrete with a base slump of 18 cm and an air content of 3.8% was obtained.

As the colorant, a commercially available titanium oxide was filled in a predetermined amount in the package made from the packaging material of Preparation Example 2 to make a package, the package was thrown into the base concrete, and the colorant was added under stirring. The concrete after the addition of the colorant had a slump of 18.5 cm and an air content of 4.2%.

For the concrete to which the package containing the colorant was added, the color irregularities and color forming characteristics were compared with that to which the coloring agent was directly added as in the prior art. As a result, no difference was found in both respects.

Regarding the cracking of the surface, in contrast with the amount of cracks 2.2 (m/m²) in the concrete to which the coloring agents according to the prior art method were added, the amount of cracks in the concrete to which the package with the packaging material of the present invention was added was as small as 2.0 (m/m²).

Example 10

An example is shown in which a reinforcing material was placed in the packaging material of the present invention and the performance thereof evaluated.

TABLE 15

| Formulation of base concrete | | |
|---|---|---|
| Water | Tap water | 180 kg/m³ |
| Cement | Produced by Onoda Cement K.K. Specific gravity 3.16 | 320 kg/m³ |
| Fine aggregate | River sand from River Fuji FM 2.30. Specific gravity 2.65 | 793 kg/m³ |
| Coarse aggregate | Crushed stone from Kisarazu FM 6.80, Specific gravity 2.60 Max. size of coarse aggregate 20 mm | 956 kg/m³ |
| s/a | 45% | |
| AE water reducer | Pozolith No. 70 | 0.38 kg/m³ |
| AE agent | Pozolith No. 303A | 0.03 kg/m³ |

As the reinforcing material, carbon fibers dispersed in silica fume were filled in a predetermined amount (2%/volume) in the package made from the packaging material of Preparation Example 2, to make a package of the present invention.

The package was thrown into the base concrete, followed by stirring to make a concrete.

Also, the same reinforcing material was added directly to the base concrete, followed by stirring to make a concrete.

The fresh concretes had the properties as shown below in Table 16.

TABLE 16

| | Slump | Air content |
|---|---|---|
| Base concrete | 18.5 cm | 3.5% |
| Reinforcing material added | 17.5 cm | 4.5% |
| Packaged reinforcing material added | 17.2 cm | 4.7% |

The concrete at the material age of 28 days had the strengths as shown below in Table 17.

TABLE 17

| | Flexural strength | Compressive strength | Tensile strength |
|---|---|---|---|
| Base concrete | 35 | 300 | 30 |
| Reinforcing material added | 55 | 295 | 40 |
| Packaged reinforcing material added | 56 | 293 | 42 |

Regarding the cracking of the surface, in contrast with the amount of cracks 1.50 (m/m²) in the concrete to which the reinforcing material according to the prior art method was added, the amount of cracks in the concrete to which the package with the packaging material of the present invention was added was as small as 1.35 (m/m²).

I claim:

1. A substantially water-insoluble and alkali-hydrolyzable package comprising a fiber and a carboxyl-containing polymer, to be disintegrated in a cement admixture.

2. A package as claimed in claim 1, wherein said carboxyl-containing polymer is a polysaccharide derivative selected from the group consisting of carboxymethyl cellulose, carboxyethyl cellulose and carboxymethylated starch or salts thereof.

3. A package as claimed in claim 1, wherein said carboxyl-containing polymer is a homopolymer or a copolymer of a carboxyl-containing monomer.

4. A package as claimed in claim 1, wherein the weight ratio of the carboxyl-containing polymer to the fibrous material is 80/20 to 0.1/99.9.

5. A package as claimed in claim 1, wherein said fiber is pulp.

6. A package as claimed in claim 2, wherein said polysaccharide derivative is carboxymethyl cellulose.

7. A package as claimed in claim 1, wherein said package encompasses at least one member selected from the group consisting of a superplasticizer, an air-entraining agent, a water-reducing agent, a super water-reducing agent, a foaming agent, a gas foaming agent, a setting accelerator, a setting retarder, a rust or corrosion inhibitor, a permeability reducer, a shrinkage reducing agent, a coloring agent, and a reinforcing material.

8. A package for a constituent of a cement admixture consisting essentially of a carboxyl-containing polymer and a fiber, the package being alkali hydrolyzable, whereby the package is able to disintegrate in the cement admixture.

9. A package as claimed in claim 1, wherein said carboxyl-containing polymer is selected from the group consisting of fibrous carboxymethyl cellulose, carboxyethyl cellulose and salts thereof.

* * * * *